United States Patent [19]

Creemers et al.

[11] 4,209,436

[45] Jun. 24, 1980

[54] PROCESS FOR THE REMOVAL OF NON-CONVERTED MONOMERS FROM A COPOLYMER OF ACRYLONITRILE

[75] Inventors: Henricus M. J. C. Creemers, Geleen; Hubertus J. G. Henskens, Spaubeek, both of Netherlands

[73] Assignee: Stamicarbon, B.V., Geleen, Netherlands

[21] Appl. No.: 969,979

[22] Filed: Dec. 15, 1978

[30] Foreign Application Priority Data

Dec. 15, 1977 [NL] Netherlands ........................ 7713885

[51] Int. Cl.² ............................................. C08F 6/16
[52] U.S. Cl. ..................... 260/29.7 PT; 260/29.6 PT; 528/500
[58] Field of Search ................ 260/29.6 PT, 29.7 PT; 528/500

[56] References Cited

U.S. PATENT DOCUMENTS

| | | | |
|---|---|---|---|
| 2,451,332 | 10/1948 | Green | 260/29.7 PT |
| 3,320,220 | 5/1967 | DiDrusco et al. | 260/29.7 PT |

*Primary Examiner*—Stanford M. Levin

*Attorney, Agent, or Firm*—Cushman, Darby & Cushman

[57] ABSTRACT

Process for the removal of unconverted monomers from a copolymer of acrylonitrile with one or more monomers copolymerizable therewith by a treatment with steam wherein a latex of said copolymer obtained from a polymerization stage is subjected to a continuous treatment with steam comprising atomizing said latex to form a gas-liquid-mixture consisting of latex droplets dispersed in a gas-phase and passing the said gas-liquid-mixture through a gas-liquid contacting device, the gasphase is separated from the mixture, this gasphase is at least partially condensed, the condensate is separated into an organic and an aqueous phase, the thus separated organic phase is returned to the polymerization stage, and the latex is further processed.

This process is especially suitable to remove non-converted monomers from latices of copolymers of (α-methyl) styrene and acrylonitrile or graft copolymers thereof on a rubbery polymer.

8 Claims, 1 Drawing Figure

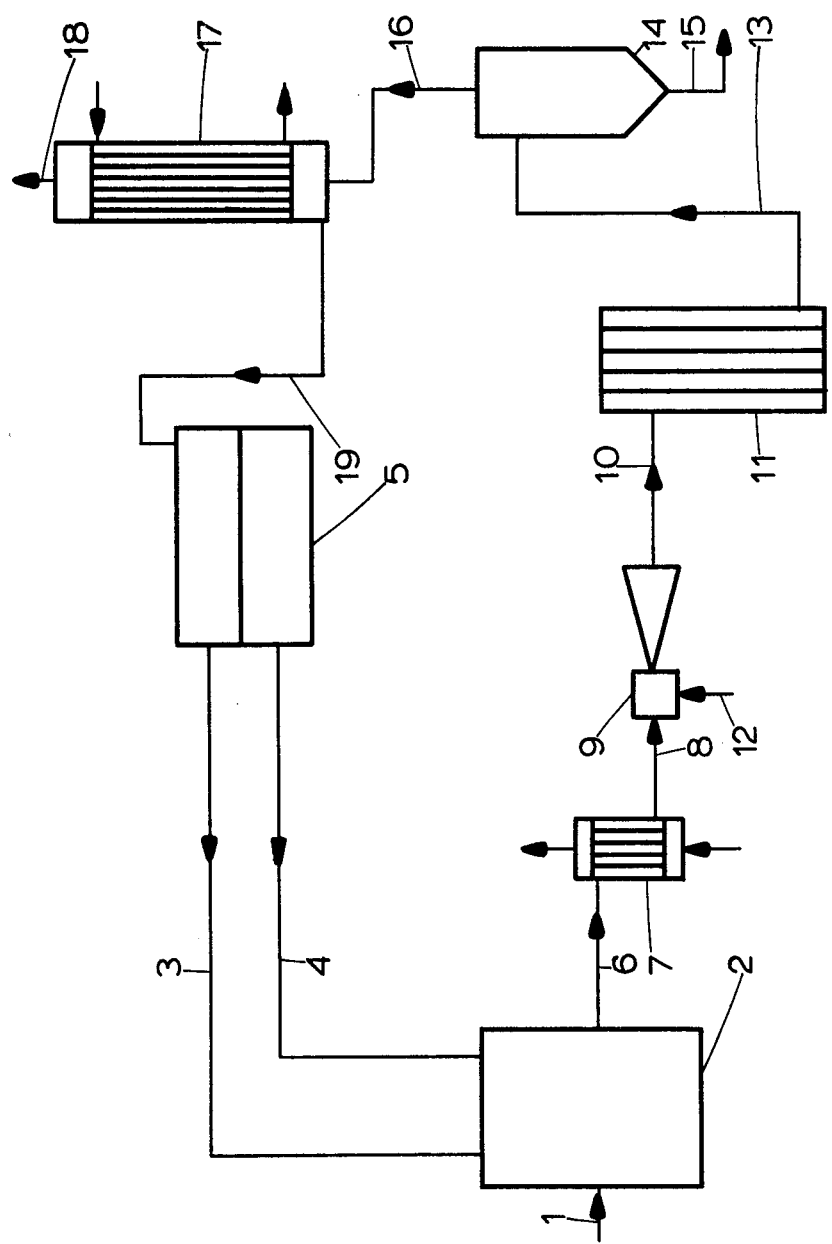

PROCESS FOR THE REMOVAL OF NON-CONVERTED MONOMERS FROM A COPOLYMER OF ACRYLONITRILE

The invention relates to a process for the removal of non-converted monomers from a copolymer of acrylonitrile with one or more monomers copolymerizable therewith by a treatment with steam.

When copolymers are prepared on the basis of, i.a. acrylonitrile, such as styrene-acrylonitrile copolymers (SAN), graft copolymers of styrene and acrylonitrile and the like, the problem arises that an amount of non-converted monomer is still contained in the polymerization mixture after termination of the polymerization. This is particularly the case in the polymerizations that are effected in emulsion or suspension.

In many instances it is undesirable that non-converted monomer is retained. One of these reasons resides in the properties of these monomers. The presence of acrylonitrile and, e.g., styrene or α-methyl styrene in styrene-acrylonitrile copolymers (SAN) or in ABS is undesirable from environmental and/or toxicological point of view. In addition, demands are made on the migration of monomers from these copolymers when they can get into contact with food-stuffs. It should furthermore be avoided that these monomers can be released when the copolymer is being processed.

From economical point of view it is to be preferred to convert the monomers as much as possible into copolymer. To achieve this, all kinds of suggestions have been made, such as raising the degree of conversion during the polymerization reaction. Thus it is possible in theory to convert virtually all monomers into copolymers. However, this considerably lengthens the time required for the polyermization, which is undesirable.

Another possibility is that, after termination of the polymerization reaction, steam or another gas or gaseous mixture is passed over or through the polymerization mixture. In principle, this is done at the reaction pressure, but the pressure may also be higher or lower (Netherlands Patent Application No. 279,731 corresponding to U.S. Pat. No. 3,325,457). Only part of the monomers (up to 40%) can be removed in this way. It may moreover involve a considerably lengthening of the time required for the polymerization. The process may also have adverse effects on the properties of the final product, such as the gloss and heat-resistance.

The object of the invention is to provide an effective, cheap and continuous process for the removal of non-converted monomers from a copolymer of acrylonitrile in which said drawbacks are mitigated.

The invention is characterized in that
a latex of said copolymer obtained from a polymerization stage is subjected to a continuous treatment with steam comprising
atomizing said latex to form a gas-liquid mixture consisting of latex droplets dispersed in a gas phase and
passing the said gas-liquid mixture through a gas-liquid contacting device,
the gas phase is separated from the mixture,
this gas phase is at least partially condensed,
the condensate is separated into an organic and an aqueous phase,
the thus separated organic phase is returned to the polymerization stage, and
the latex is further processed.

A possible embodiment of the process according to the invention is that the latex is atomized with steam by means of a suitable two-phase sprayer, such as, e.g., an injector, that is operated by steam. In this embodiment the pressure over the latex after the injector may be lowered to increase the efficiency of monomer removal.

Another embodiment is that the latex is reduced in pressure as much as possible and atomized by means of a simple one-phase sprayer, so that the gas phase of the said gas-liquid mixture is obtained by the evaporation of water and other volatile components present in the latex, which evaporation is brought about by a pressure drop during said atomization. In this embodiment it may be necessary to preheat the latex slightly.

This process in which the latex is atomized and then the steam and the latex are put into intimate contact in a gas-liquid contacting device is particularly advantageous. In particular, the greater part of the monomers present are removed in a simple way, while, surprisingly, no problems arise as regards frothing, the quality of the end product, or undesired coagulation or fouling of the equipment. This is the more surprising as the presence of unconverted acrylonitrile in combination with soap i.e. emulsifier in the latex very soon gives rise to frothing.

Especially in the case of a copolymer containing styrene and/or α-methyl styrene and acrylonitrile, an amount of (α-methyl) styrene may be retained in the latex after application of the process according to the invention. In a special embodiment of the invention, these monomers are removed by first coagulating the latex after the steam treatment and then stripping it in counter-current flow to a gas, or by stripping it in counter-current flow to steam immediately after the steam treatment. The gas released in the counter-current stripping treatment is condensed, fully or partly, if so desired, together with the gaseous mixture from the first steam treatment. The liquid phase is recycled to a polymerization stage, or to the counter-current stripping treatment, if so desired, after separation of the organic phase and the aqueous phase.

It is possible to strip the non-coagulated latex in countercurrent flow to steam (or another gas) only, without previously treating it with steam according to the invention. This has the drawback, however, that the latex presents many problems with respect to frothing owing to the large difference between the boiling points of the components to be removed. According to the invention, preference is given to a previous steam treatment, since, surprisingly, this problem does not arise.

The gases that have not been condensed may still contain monomers. To remove these monomers so that the gases may be vented, these gases may be passed over or through a bed of active carbon. After some time this bed of active carbon is regenerated, releasing a gas flow containing monomer that may be further processed separately or mixed with another flow of gas. The advantage of the use of a bed of active carbon is that, after regeneration, a small flow of gas with a high monomer concentration is obtained that is much simpler to process than the original gas flows.

In addition, it is also possible to pass such gas flows containing monomers to a catalytic or non-catalytic combustion.

The process according to the invention may be used for all copolymers containing acrylonitrile, such as copolymers of acrylonitrile with styrene, α-methyl styrene, and/or acrylate possibly grafted on a rubber, such as polybutadiene, styrene-butadiene, ethylene-propylenediene rubber, butadiene-acrylonitrile rubber, acrylate rubber, etc. Acrylonitrile is also meant to include derivatives thereof, e.g. methacrylonitrile.

The process is particularly suitable for the removal of non-converted monomers from graft copolymers of (α-methyl) styrene and acrylonitrile on a butadiene rubber (ABS).

These graft copolymers may have been prepared by emulsion polymerization, in which a latex of the graft copolymer is formed. This latex can very well be treated in the above way with a high efficiency of removal without undesirable coagulation or alteration of the product properties.

The process according to the invention is preferably effected at temperatures of between 297° and 367° K., preferably between 322° and 352° K.

The pressures at which the process according to the invention is carried out are not critical. They preferably range between 2.5 and 500 kPa, more in particular between 2.5 and 150 kPa.

The residence time of the gas-liquid mixture in the device in which the steam treatment is effected (the gas-liquid contacting device in the preferable embodiment) is determined mainly by the time required to effect proper removal of the monomers. This time will generally range between 0.001 and 10 seconds. Excellent removal of monomers can be achieved with longer residence times, but then problems with regards to the product properties may arise. Residence times up to 1 minute can be used very well.

The invention will be elucidated with reference to the FIGURE, which shows a diagram of an embodiment of the process according to the invention.

In this FIGURE all necessary starting materials and auxiliary substances are fed through line 1 to a polymerization stage, which is shown as a block 2. Lines 3 and 4 serve to feed an organic phase and an aqueous phase, respectively, from the separator 5 to the polymerization stage. The organic phase is added to the monomers and the aqueous phase is used for the preparation of auxiliary substances. The latex is discharged from polymerization stage 2 through line 6. This latex, if necessary after heating in heater 7, is fed to gas-liquid contacting device 11 by way of line 8, injector 9 and line 10. Depending on the operating conditions, an amount of steam is supplied to injector 9 through line 12. A gas-liquid mixture is discharged from contacting device 11 through line 13. This gas-liquid mixture is separated in gas-liquid separator 14. The degassed latex is discharged through conduit 15 for further processing (such as coagulation). A gaseous mixture escapes from the top of separator 14 through line 16 and is then cooled in condensor 17. Uncondensed gases are discharged through line 18. The liquid is passed through line 19 to separator 5, where an organic phase and an aqueous phase form that are returned to the polymerization stage 2 through lines 3 and 4, respectively. The invention will now be elucidated with reference to some examples.

EXAMPLE I

In a device described in the FIGURE, an ABS latex was prepared in the polymerization stage by emulsion polymerization of styrene and acrylonitrile in the presence of a polybutadiene latex. After leaving heater 7, the ABS latex had a temperature of 352° K. This latex was mixed with steam in injector 9 in a steam/latex weight ratio of about 0.1. The residence time in the gas-liquid contacting device was 0.05 sec. After separation of the gas-liquid mixture, it was found that the acrylonitrile content had been reduced to about 30% and the styrene content to about 60% of the original value. The gaseous mixture from separator 14 was largely condensed and separated into an organic phase and a liquid phase, and recycled to the polymerization stage. The recirculation of the organic and the liquid phase did not have any adverse effect on the properties of the end product.

EXAMPLE II

A number of experiments were carred out in an experimental set-up on a semitechnical scale. In these experiments an ABS latex (general-purpose type) was sprayed with steam by way of a two-phase sprayer, while the pressure over the latex was reduced from atmospheric to the value mentioned in the table, and then passed through a gas-liquid contacting device. Here the efficiency of the removal of acrylonitrile and styrene was determined in dependence on a number of variables. It was also examined if fouling of the equipment occurred.

Table I

| Experiment | $T_1$ | $T_2$ | P | S/L | $\Delta t$ | $\Delta ACN$ | $\Delta Sty$ | Fouling (I) |
|---|---|---|---|---|---|---|---|---|
| 1 | 322 | 297 | 3.2 | 0.13 | 0.004 | 72 | 40 | — |
| 2 | 322 | 322 | 16.7 | 0.11 | 0.022 | 67 | 34 | — |
| 3 | 322 | 322 | 16.7 | 0.11 | 0.022 | 55 | 26 | — |

(I) —: no fouling; +: fouling where:
- $T_1$: temperature of latex before treatment (K.)
- $T_2$: temperature of latex after treatment (K.)
- P: pressure of latex during treatment (kPa)
- S/L: steam/latex weight ratio
- $\Delta t$: average residence time of latex in gas-liquid contacting device (seconds)
- $\Delta ACN$: weight percentage of ACN removed with respect to untreated latex
- $\Delta Sty$: weight percentage of styrene removed with respect to untreated latex.

EXAMPLE III

The same latex was treated in the same way as in Example II. Here the treatment was performed four times in succession.

Table II

| | $T_1$ | $T_2$ | P | S/L | $\Delta t$ | $\Delta ACN$ | $\Delta Sty$ |
|---|---|---|---|---|---|---|---|
| 1st pass | 352 | 342 | 38.7 | 0.05 | 0.11 | 64 | 35 |
| 2nd pass | 352 | 342 | 38.7 | 0.05 | 0.11 | 80 | 52 |
| 3rd pass | 352 | 342 | 38.7 | 0.05 | 0.11 | 86 | 61 |
| 4th pass | 352 | 342 | 38.7 | 0.05 | 0.11 | 94 | 72 |

The meaning of the variables is the same as in Example II, it should be noted that the efficiencies of removal are given with respect to the latex before the first treatment.

EXAMPLE IV

The same latex as used in the previous examples was subjected to experiments in which temperature and pressure were so chosen that so much steam was formed when the pressure was lowered that the supply of additional steam was not necessary. The results of these experiments are given in Table III.

Table III

| Experiment | number of passes | T$_1$ | T$_2$ | P | S/L | Δt | ΔACN | ΔSty |
|---|---|---|---|---|---|---|---|---|
| 5 | 1 | 362 | 326 | 13.2 | 0.047 | 0.021 | 75 | 45 |
| 6 | 1 | 362 | 327 | 13.2 | 0.049 | 0.018 | 79 | 42 |
| 7 | 1 | 362 | 329 | 13.2 | 0.047 | 0.014 | 78 | 46 |
| 8 | 1 | 362 | 329 | 13.2 | 0.048 | 0.012 | 76 | 41 |
| 9 | 1 | 362 | 335 | 13.2 | 0.039 | 0.013 | 75 | 35 |
| 10 | 2 | 354 | 329 | 12.8 | 0.037 | 0.017 | 82 | 50 |
| 11 | 2 | 354 | 328 | 10.1 | 0.037 | 0.020 | 92 | 50 |
| 12 | 2 | 354 | 325 | 7.1 | 0.042 | 0.019 | 92 | 50 |

The various variables have the same meaning as in Examples II and III. In none of the experiments did coagulation of the latex occur, while the equipment was not fouled either.

EXAMPLE V

A number of experiments were carried out on an ABS latex containing α-methyl styrene in addition to styrene in the same way as in Example II. The results are compiled in Table IV. The variables in the table have the same meaning as in Table I, ΔAMS referring to the weight percentage of α-methyl styrene removed with respect to the original latex.

Table IV

| Experiment | T$_1$ | T$_2$ | P | S/L | Δt | ΔACN | ΔSty | ΔAMS |
|---|---|---|---|---|---|---|---|---|
| 13 | 342 | 348 | 42.7 | 0.31 | 0.08 | 76 | 50 | 46 |
| 14 | 342 | 355 | 61.3 | 0.40 | 0.09 | 90 | 74 | 58 |

We claim:

1. Process for the removal of unconverted monomers from a copolymer of acrylonitrile with styrene and/or (αmethyl)styrene or a copolymer of said monomers grafted on a rubber, by a treatment with steam, consisting essentially in
subjecting a latex of said copolymer, obtained from a polymerization stage, to a continuous treatment with steam including
atomizing said latex to form a gas-liquid mixture consisting essentially of latex droplets dispersed in a gas phase and thereafter passing the said gas-liquid mixture through a gas-liquid contacting device,
separating the gas phase from said mixture,
at least partially condensing this separated gas phase,
separating the resulting condensate into an organic and an aqueous liquid phase,
returning the thus-separated organic phase to the polymerization process, and
recovering said copolymer as a latex emulsion from said mixture.

2. Process of claim 1, characterized in that the gas phase of the said gas-liquid mixture is obtained by evaporation of water and other volatile components present in the latex, brought about by a pressure drop during said atomization.

3. Process of claim 1, characterized in that the latex is atomized with steam by means of a suitable atomization device.

4. Process according to claim 1, characterized in that the aqueous phase separated out of the condensate is returned to the polymerization stage.

5. Process according to claim 1 characterized in that the residence time of the gas-liquid mixture in the gas-liquid contacting device is between 0.001 to 10 seconds.

6. Process according to claim 1, characterized in that the separated latex, before or after coagulation, is subjected to a counter-current stripping treatment with steam.

7. Process according to claim 6, characterized in that the gas mixture emerging from the counter-current stripping treatment with steam is condensed together with the gas phase obtained after separation of the said gas-liquid mixture.

8. Process according to claim 7, characterized in that a latex of a copolymer of (α-methyl) styrene and acrylonitrile or a graft copolymer thereof on a rubbery polymer, is subjected to a treatment with steam.

* * * * *